US008119756B2

(12) United States Patent
Harris et al.

(10) Patent No.: US 8,119,756 B2
(45) Date of Patent: Feb. 21, 2012

(54) HYDROLYTICALLY DEGRADABLE POLYMERS AND HYDROGELS MADE THEREFROM

(75) Inventors: J. Milton Harris, Huntsville, AL (US); Michael D. Bentley, Huntsville, AL (US); Xuan Zhao, Beijing (CN); Xiaoming Shen, Madison, AL (US)

(73) Assignee: Nektar Therapeutics, San Francisco, CA (US)

( * ) Notice: Subject to any disclaimer, the term of this patent is extended or adjusted under 35 U.S.C. 154(b) by 0 days.

(21) Appl. No.: 13/027,218

(22) Filed: Feb. 14, 2011

(65) Prior Publication Data
US 2011/0135592 A1 Jun. 9, 2011

Related U.S. Application Data

(63) Continuation of application No. 12/826,664, filed on Jun. 29, 2010, now Pat. No. 7,910,685, which is a continuation of application No. 12/559,162, filed on Sep. 14, 2009, now Pat. No. 7,772,357, which is a continuation of application No. 11/890,162, filed on Aug. 3, 2007, now Pat. No. 7,608,678, which is a continuation of application No. 11/377,973, filed on Mar. 17, 2006, now Pat. No. 7,259,224, which is a continuation of application No. 10/412,642, filed on Apr. 10, 2003, now Pat. No. 7,074,878, which is a continuation of application No. 10/076,018, filed on Feb. 14, 2002, now abandoned, which is a continuation of application No. 09/459,312, filed on Dec. 10, 1999, now Pat. No. 6,348,558.

(51) Int. Cl.
C07K 1/107 (2006.01)
A01N 37/00 (2006.01)

(52) U.S. Cl. .................. 527/200; 424/78.17; 424/78.27; 514/548

(58) Field of Classification Search ............... 424/78.17, 424/78.27; 514/506, 548
See application file for complete search history.

(56) References Cited

U.S. PATENT DOCUMENTS

| | | | |
|---|---|---|---|
| 4,670,417 A | 6/1987 | Iwasaki et al. | |
| 5,252,714 A | 10/1993 | Harris et al. | |
| 5,281,698 A | 1/1994 | Nitecki | |
| 5,463,012 A | 10/1995 | Ferruti et al. | |
| 5,468,478 A | 11/1995 | Saifer et al. | |
| 5,650,234 A | 7/1997 | Dolence et al. | |
| 5,672,662 A | 9/1997 | Harris et al. | |
| 5,824,784 A | 10/1998 | Kinstler et al. | |
| 5,900,461 A | 5/1999 | Harris | |
| 5,932,462 A | 8/1999 | Harris et al. | |
| 6,348,558 B1 | 2/2002 | Harris et al. | |
| 6,362,254 B2 | 3/2002 | Harris et al. | |
| 6,432,397 B1 | 8/2002 | Harris | |
| 6,610,281 B2 | 8/2003 | Harris | |
| 7,074,878 B1 | 7/2006 | Harris et al. | |
| 7,259,224 B2 | 8/2007 | Harris et al. | |
| 7,608,678 B2 | 10/2009 | Harris et al. | |
| 7,772,357 B2 | 8/2010 | Harris et al. | |
| 7,910,685 B2 | 3/2011 | Harris et al. | |
| 2004/0013637 A1* | 1/2004 | Bentley et al. | 424/78.17 |
| 2007/0276116 A1 | 11/2007 | Harris et al. | |
| 2010/0004392 A1 | 1/2010 | Harris et al. | |
| 2010/0267895 A1 | 10/2010 | Harris et al. | |

FOREIGN PATENT DOCUMENTS
WO WO 99/55760 11/1999

OTHER PUBLICATIONS

Abuchowski, et al., "Cancer Therapy with Chemically Modified Enzymes. I. Antitumor Properties of Polyethylene Glycol-Asparaginase Conjugates," Cancer Biochem. Biophys., vol. 7, pp. 175-186, (1984).
Andresz, et al., "Chernische Synthese verzweigter Polysaccharide 5*," Makrornol. Chern., vol. 179, pp. 301-312, (1978).
Beauchamp, et al., "A New Procedure for the Synthesis of Polyethylene Glycol-Protein Adducts: Effects on Function, Receptor Recognition, and Clearance of Superoxide Dismutase, Lactoferrin, and u2-Macroglobulin," Anal. Biochem., vol. 131, pp. 25-33, (1983).
Buckman, et al., "Functionalization of Poly(ethylene glycol) and Monornethoxy-Poly(ethylene glycol)," Makrornol. Chern., vol. 182, pp. 1379-1384, (1981).
Elling, et al., "Immunoaffinity Partitioning: Synthesis and Use of Polyethylene Glycol-Oxirane for Coupling to Bovine Serum Albumin and Monoclonal Antibodies," Biotech. and Appl. Biochem., vol. 13, pp. 354-362, (1991).
Goodson, et al., "Site-Directed Pegylation of Recornbinant Interleukin-2 at its Glycosylation Site," Bio/Technology, vol. 8, pp. 343-346, (Apr. 1990).
Harris, et al., "Synthesis and Characterization of Poly(Ethylene Glycol) Derivatives," J. Polyrn. Sci., vol. 22, pp. 341-352, (1984).
Joppich, et al., "Peptides Flanked by Two Polymer Chains, I-Synthesis of Glycyi-L-tryptophylglycine Substituted by Poly(ethylene oxide) at both the Carboxy and the Amino End Groups," Makromol. Chern., vol. 180, pp. 1381-1384, (1979).
Kogan, "The Synthesis of Substituted Methoxy-Poly(Ethylene Glycol) Derivatives Suitable for Selective Protein Modification," Synthetic Communications, 22(16), pp. 2417-2424, (1992).
Olson, et al., "Preparation and Characterization of Poly(ethylene glycol)ylated Human Growth Hormone Antagonist," Poly(ethylene glycol) Chemistry and Biological Applications, pp. 170-181, Harris & Zalipsky Eds., ACS, Washington, D.C., (1997).
Ouchi, et al., "Design of Antitumor Agent-Terminated Poly(Ethylene Glycol) Conjugate as Macromolecular Prodrug," Polymer Preprints, vol. 38, No. 1, pp. 582-583, (Apr. 1997).
Pitha, et al., "Detergents Linked to Polysaccharides: Preparation and Effects on Membranes and Cells," Eur. J. Biochem., vol. 94, pp. 11-18, (1979).

(Continued)

Primary Examiner — Terressa Boykin
(74) Attorney, Agent, or Firm — Mark A. Wilson

(57) ABSTRACT

Methods for delivering a biologically active agent into the body of a mammal are provided, the method comprising administering a carbamate-containing conjugate to the mammal.

6 Claims, No Drawings

OTHER PUBLICATIONS

Romani, et al., "Synthesis of Unsymmetrical Cystine Peptides: Directed Disulfide Pairing with the Sulfenohydrazide Method," Chemistry of Peptides and Proteins, vol. 2, pp. 29-34, (1984).

Sartore, et al., "Enzyme Modification by MPEG with an Amino Acid or Peptide as Spacer Arms," Appl. Biochem. and Biotech., vol. 27, pp. 45-54, (1991).

Sawhney, et al., "Bioerodible Hydrogels Based on Photopolymerized Poly(ethylene glycol)-co-poly(a-hydroxy acid) Diacrylate Macromers," Macromolecules, vol. 26, No. 4, pp. 581-587, (1993).

Tondelli, et al., "Poly(Ethylene Glycol) Imidazolyl Formates as Oligomeric Drug-Binding Matrices," J. Controlled Release, vol. 1, pp. 251-257, (1985).

Veronese, et al., "Smface Modifications of Proteins—Activation of Monornethoxy-Polyethylene Glycols by Phenylchloroformates and Modification of Ribonuclease and Superoxide Dismutase," Appl. Biochem. and Biotech., vol. II, pp. 141-152, (1985).

Woghiren, et al., "Protected Thiol-Polyethylene Glycol: A New Activated Polymer for Reversible Protein Modification," Bioconj. Chern., vol. 4, No. 5, pp. 314-318, (1993).

Zalipsky, et al., "Attachment of Drugs to Polyethylene Glycols," Eur. Polym. J., vol. 19, No. 12, pp. 1177-1183, (1983).

Enzon Pharmaceuticals, Macromolecular Engineering Technologies, pp. 1-14, (2004).

NEKTAR™—Transforming Therapeutics, Nektar Molecule Engineering: Polyethylene Glycol and Derivatives for Advanced PEGylation, pp. 1-20, Catalog—2003, (Jul. 2003).

NEKTAR™—Transforming Therapeutics, Nektar Advanced PEGylation: Polyethylene Glycol and Derivatives for Advanced PEGylation, pp. 1-24, Catalog—2004, (Jul. 2004).

NOF Corporation, "PEG Derivatives, Phospholipid and Drug Delivery Materials for Pharmaceuticals", pp. 1-46, Catalogue 2003-1st, (Jan. 2003).

NOF Corporation, "PEG Derivatives, Phospholipid and Drug Delivery Materials for Pharmaceuticals", pp. 1-50, Catalogue 2003-2nd, (Mar. 2004).

NOF Corporation, "PEG Derivatives, Phospholipids and Drug Delivery Materials for Pharmaceutical Products and Formulations", pp. 1-59, Catalogue Ver. 8, (Apr. 2006).

Polypure, Products; PEG amines; PEG acids and amino acids; PEG thiols and disulfides; Biotins, (Apr. 2004).

Polypure, Products; PEG amines; PEG acids and amino acids; PEG thiols and disulfides; Biotins, (Apr. 2005).

Quanta Biodesign, Labeling, Derivatization and Crosslinking Reagents for Biological and Related Materials with dPEG™, pp. 1-38, (Mar. 12, 2004).

Quanta Biodesign, Labeling, Modification and Crosslinking Reagents incorporating our unique monodispersed dPEG™ Technology, pp. 1-31, (Nov. 5, 2004).

Quanta Biodesign, Ltd., Leading innovator, producer and provider of monodisperse discrete PEG™ (dPEG™) derivatives, (Product Catalog), pp. 1-51, (Updated: Jul. 18, 2005).

Quanta Biodesign, Ltd., Leading innovator, producer and provider of monodisperse discrete PEG™ (dPEG™) derivatives, (Product Catalog), pp. 1-51, (Updated: Nov. 17, 2005).

Shearwater Polymers, Inc., Polyethylene Glycol and Derivatives, pp. 1-49, (Catalog—Mar. 1995).

Shearwater Polymers, Inc., Polyethylene Glycol and Derivatives, pp. 1-53, (Catalog—Jul. 1997).

Shearwater Polymers, Inc., Polyethylene Glycol and Derivatives: Functionalized Biocompatible Polymers for Research and Pharmaceuticals, pp. 1-50, (Catalog—Jan. 2000).

Shearwater Corporation, Polyethylene Glycol and Derivatives for Biomedical Applications, pp. 1-17, (Catalog—Jul. 2001).

* cited by examiner

HYDROLYTICALLY DEGRADABLE POLYMERS AND HYDROGELS MADE THEREFROM

CROSS REFERENCE TO RELATED APPLICATIONS

This application is a continuation of U.S. patent application Ser. No. 12/826,664, filed Jun. 29, 2010, now U.S. Pat. No. 7,910,685, which is a continuation of U.S. patent application Ser. No. 12/559,162, filed Sep. 14, 2009, now U.S. Pat. No. 7,772,357, which is a continuation of U.S. patent application Ser. No. 11/890,162, filed Aug. 3, 2007, now U.S. Pat. No. 7,608,678, which is a continuation of U.S. patent application Ser. No. 11/377,973, filed Mar. 17, 2006, now U.S. Pat. No. 7,259,224, which is a continuation of U.S. patent application Ser. No. 10/412,642, filed Apr. 10, 2003, now U.S. Pat. No. 7,074,878, which is a continuation of U.S. patent application Ser. No. 10/076,018, filed Feb. 14, 2002, now abandoned, which is a continuation of U.S. patent application Ser. No. 09/459,312, filed Dec. 10, 1999, now U.S. Pat. No. 6,348,558, all of which are incorporated herein by reference in their entireties.

FIELD OF THE INVENTION

This invention generally relates to water soluble, hydrolytically degradable, and nonpeptidic polymers, and particularly to polymers and gels therefrom that are suitable for medical devices, drug enhancement and in vivo delivery of biologically active agents.

BACKGROUND OF THE INVENTION

Conjugation of agents having a known or potential therapeutic benefit to water soluble, non-immunogenic polymers can impart to the agent desirable characteristics including, among others, improved solubility, greater stability, and reduced immunogenicity. It has become increasingly important in the pharmaceutical industry to develop conjugates having these characteristics so as to increase the number of options for therapeutic benefit.

An example of a polymer that can be used to develop conjugates with therapeutic agents is poly(ethylene glycol) ("PEG"). Therapeutic agents conjugated to PEG are sometimes said to be "PEGylated." Several PEGylated therapeutics have been developed that exhibit enhanced water solubility, longer circulation lifetimes, and lower immunogenicity as compared to the unconjugated therapeutic agent. Because of the rapid motion and heavy hydration of the polymer, PEGs usually are of much higher apparent molecular weight than the therapeutics to which they are attached. Thus, they tend to mask the therapeutic agent from the immune system and to preclude excretion through kidneys.

The term PEG is commonly used to describe any of a series of polymers having the general formula $HO-(CH_2CH_2-O)_n-H$, where "n" represents the number of ethylene oxide monomers in the polymer. However, the parent polymer is generally unsuitable for attachment to a therapeutic agent. Hydroxyl groups are relatively unreactive toward groups commonly present on therapeutic agents and thus PEG normally has to be "activated" by converting at least one end hydroxyl group into a more reactive form. It is also usually important to activate the PEG polymer with a terminal group that is selective in its reactions. For example, several PEG derivatives have been developed that are more likely to react with amine groups. Others have been developed that preferentially react with thiol groups.

Successful PEG derivatives may have to meet a number of requirements, depending on the specific application. For conjugation to proteins, the PEG derivative should usually have a desirable and suitably selective reactivity at physiologic conditions of temperature, pressure, and pH to preserve the activity of the unconjugated protein. In some circumstances, it is desirable to cleave the PEG polymer from the therapeutic agent at some point after the agent is delivered in vivo.

Some PEG derivatives have been used in combination with other polymers to prepare insoluble gels in which drugs can be entrapped or chemically bound. For example, Sawhney et al., *Macromolecules,* 26:581 (1993) describes the preparation of block copolymers of PEG with polyglycolide or polylactide blocks at both ends of the PEG chain. The copolymers are then activated by terminal substitution with acrylate groups, as shown below.

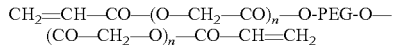

In the above formula, the glycolide blocks are the $-O-CH_2-CO-$ units. The addition of a methyl group to the methylene gives a lactide block; n can be multiples of 2. Vinyl polymerization of the acrylate groups produces an insoluble, crosslinked gel with a polyethylene backbone.

The polylactide or polyglycolide segments of the polymer backbone shown above, which are ester groups, are susceptible to slow hydrolytic breakdown, with the result that the crosslinked gel undergoes slow degradation and dissolution. The hydrogel degrades in vivo and can result in non-PEG components being released into the blood stream, which can be undesirable.

It is desirable to develop improved polymers providing additional choices for use in drug delivery and other applications.

SUMMARY OF THE INVENTION

This invention provides a water soluble, nonpeptidic polymer having two or more oligomers linked together by hydrolytically degradable carbonate linkages. The polymer can be hydrolytically degraded into small oligomers in an aqueous environment, including in vivo conditions. The polymer is easy to prepare and the molecular weight of the oligomers resulting from polymer degradation can be easily controlled, which can be desirable for some applications. The polymer can be conjugated to a biologically active agent such as a protein or peptide. The polymer can impart desirable characteristics to the conjugates of improved water solubility and reduced immunogenicity. The polymer is useful for preparing insoluble cross linked structures, including hydrogels, that are hydrolytically degradable into soluble polymers of predetermined molecular weight.

The oligomers are alkylene oxide oligomers. Typically, the oligomers are ethylene oxide oligomers, and the polymer is a poly(ether carbonate) having the formula of:

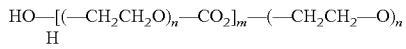

where n is from about 1 to 2,000, normally from 2 to 2,000, and m is from about 2 to 200. Since carbonate linkages are hydrolytically degradable under mild conditions, the polymer will hydrolyze to produce oligomer fragments of much lower molecular weight than the starting polymer:

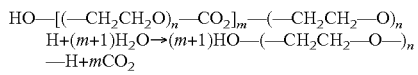

In addition to providing many of the desirable features of other polymers, including poly (ethylene glycol) as described above, this new polymer can degrade in the body and thus facilitates removal of the polymer from the body. The degradation products are themselves normally nontoxic small PEGs that typically are rapidly cleared from the body.

The polymer can be prepared in a number of ways. In one embodiment of this invention, the poly(ether carbonate) is prepared by polymerizing an activated oligomer having the formula of:

$$HO-(-CH_2CH_2O)_n-CO_2-Z$$

where n can be from about 2 to 2000 and Z is a reactive leaving group such as N-succinimidyl, 1-benzotriazolyl, or p-nitrophenyl.

The polymer can be prepared by polymerizing ethylene oxide oligomers of the formula:

$$HO-(-CH_2CH_2O)_n-H$$

where n can be from about 2 to 2000 with an activating molecule of $Z-O-CO_2-Z$, where Z is as described.

Alternatively, the ethylene oxide oligomer $$HO-(-CH_2CH_2O)_n-H$$

can be polymerized with a bifunctional ethylene oxide oligomer:

$$Z-OCO_2-(-CH_2CH_2-O-)_n-CO_2-Z$$

where n and Z are as described above, to form the poly(ether carbonate).

The polymerization reactions may be conducted either in an organic solvent or in a melt, in the presence of an organic base. Examples of suitable solvents include acetonitrile, THF, dimethylformamide, dimethylsulfoxide, benzene, toluene, the xylenes, chloroform, and methylene chloride. Examples of suitable organic bases include triethylamine, pyridine, quinoline, 4,4-dimethylaminopyridine and triethylamine. The polymerization reactions can be conducted at a temperature of from about 37° C. to 100° C., typically from about 45° C. to 100° C., and advantageously from about 70° C. to 90° C.

The polymer of this invention can be modified at one terminus with alkyl or aryl groups to make one end of the polymer inert. The polymer can be activated at one or more of its termini to form a terminal reactive moiety. Thus, a modified or activated poly(ether carbonate) of this invention can be represented as:

$$X-O-[(CH_2CH_2-O)_n-CO_2]_m-(CH_2CH_2-O)_n-Y$$

where m and n are as defined above, and where X and Y can independently be H, alkyl, alkenyl, aryl, and reactive terminal moieties, including N-succinimidyloxycarbonyl, 1-benzotriazolyloxycarbonyl, p-nitrophenyloxycarbonyl, or others. Alternatively, X and Y can include linker groups terminating in active groups such as aldehyde N-maleimidyl or -S-S-ortho-pyridyl. A wide variety of activating groups and linkers can be used.

The activated polymer of this invention can be reacted with an active group on a biologically active agent, such as a protein or peptide, to form a conjugate. For example, N-succinimiayloxy, 1-benzotriazolyloxy, and p-nitrophenyloxy are leaving groups suitable for the formation of a carbamate linkage between the polymer and a biologically active agent having an amino group. Thus proteins, peptides, amino drugs or amino carbohydrates can be linked to such activated polymers. For example, when X is H, and Y is N-succinimidyloxycarbonyl, a conjugate can be formed of the following formula:

$$HO-[(CH_2CH_2-O)_n-CO_2]_m-(CH_2CH_2-O)_n-CONH\text{-Protein}$$

When a protein to be conjugated has an accessible thiol group, the polymer of this invention can be activated to contain a terminal reactive moiety that is reactive with thiol, including, for example, iodoacetamide, vinylsulfone, maleimide, or S-S-ortho-pyridyl, which moiety is then reacted with the thiol group to form a thiol site-specific conjugate of the protein.

When the polymer of this invention is activated at two termini, it can be used as a crosslinking agent to crosslink a multifunctional molecule to form a hydrolytically degradable hydrogel. Examples of multifunctional molecules suitable as "backbones" in formation of hydrogels include proteins such as collagen, aminocarbohydrates such as chitosan, polyamines such as polylysine and poly(vinylamine), and multi-armed or branched poly(ethylene glycol) amines. The hydrogels of this invention are useful in many biomedical applications such as drug delivery, surgical adhesion prevention, wound and scar healing, bioadhesives and surgical implants.

In another embodiment, the polymer of this invention can be activated by attachment of terminal vinyl groups. This activated polymer can be self-polymerized in the presence of a conventional vinyl polymerization catalyst to form a hydrolytically degradable hydrogel.

Thus, this invention provides a versatile polymer that is especially suited for conjugating to a biologically active agent and for forming a hydrogel. The polymer is easy to prepare and can be synthesized in large quantities. The polymer can be formed in a single reaction with multiple degradable carbonate linkages in the backbone. The conjugate and hydrogel of this invention can be degraded under physiological conditions. The degradation generates oligomers of predetermined molecular weight that can be easily cleared from the body.

The foregoing and other advantages and features of the invention, and the manner in which the same are accomplished, will become more readily apparent upon consideration of the following detailed description of the invention taken in conjunction with the accompanying examples, which illustrate preferred and exemplary embodiments.

DETAILED DESCRIPTION OF THE INVENTION

The invention will now be described more fully hereinafter with reference to the accompanying examples, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "polymer" means a molecule, formed by the chemical union of two or more oligomer units. The chemical units are normally linked together by covalent linkages. The two or more combining units in a polymer can be all the same, in which case the polymer is referred to as a homopolymer. They can be also be different and, thus, the polymer will be a combination of the different units. These polymers are referred to as copolymers.

The term "oligomer" is used herein to mean a molecule, typically an organic molecule, which in itself is formed by the chemical union of two or more monomer units. The monomer units of an oligomer may be different or all the same. An oligomer is capable of reacting with another oligomer which is same or different, in a polymerization reaction to form a polymer. As used herein, the term oligomer by no means limits the size of the molecule or the number of combining units or monomers in the oligomer. Rather, "oligomer" is used to indicate a unit for forming a polymer of the invention. The structure of an oligomer in a polymer may be somewhat different in chemical structure from the oligomer prior to polymerization because of the polymerization reaction and the formation of covalent linkages.

The term "carbonate linkage" is used herein to mean a linkage that includes the group —O—$CO_2$—. It is to be understood that a carbonate linkage is distinct from a carboxylate linkage which typically has a structure of R—$CO_2$— (where n is at least 1 and R=alkyl or aryl) and has different chemical and physical properties.

The terms "group," and "moiety," are all used herein interchangeably to refer to a distinct, definable portion or unit of a molecule. Sometimes, the structure of a group or moiety may include another smaller group or moiety. For example, a functional group of —O—$CO_2$—Z includes Z which may be a reactive group or moiety including N-succinimidyl or 1-benzotriazolyl.

The terms "active," "reactive," and "functional" are used herein interchangeably to mean that a molecule or a group or moiety is reactive with other molecules or groups or moieties of molecules.

The term "biologically active agent" when used herein means any substance that can impact any physical or biochemical properties of a biological organism including, but not limited to, viruses, bacteria, fungi, plants, animals and humans. In particular, as used herein, a biologically active agent can be any substance intended for the diagnosis, cure, mitigation, treatment, or prevention of a disease in humans or other animals, or to otherwise enhance the physical or mental well being of humans or animals. Examples of biologically active agents include, but are not limited to, organic and inorganic compounds, proteins, peptides, lipids, polysaccharides, nucleotides, DNAs, RNAs, other polymers, and derivatives thereof. Examples of biologically active agents include antibiotics, fungicides, anti-viral agents, anti-inflammatory agents, anti-tumor agents, cardiovascular agents, anti-anxiety agents, hormones, growth factors, steroidal agents, and the like. Biologically active agents include microorganisms such as bacteria and yeast cells, viral particles, plant or animal or human cells or tissues, and the like, in their native or modified forms.

The oligomers used in the practice of the invention should be selected so that they and the degradation products of the polymer of this invention are water soluble and can easily be excreted from animal bodies under natural physiological conditions. They should be non-toxic, or at least of acceptable low toxicity, and should not cause a substantial adverse effect in human or animal bodies.

Many different types of alkylene oxide oligomers are useful in forming the polymer of this invention. In its simplest form, an alkylene oxide "homo-oligomer" is used having the formula of HO—(—$CHRCH_2$—O—)$_n$—H, where R is H or an alkyl, including methyl. Suitable oligomers also include alkylene oxide "co-oligomers," which are composed of different alkylene oxide monomers in which R is varied independently along the chain. An example of a co-oligomer is a structure in which two different R groups are present in a block such as HO—(—$CHR_1CH_2$—O—)$_n$—(—$CHR_2CH_2$—O—)$_m$—H, where n and m can be varied independently. An example of this type of block structure is the case in which $R_1$ is hydrogen and $R_2$ is methyl.

Block oligomers can exhibit surface activity. Degradable surfactants are useful in drug delivery systems and can be used to form micelles and thermally reversible gels. Random oligomers in which $R_1$ and $R_2$ are randomly placed along the oligomer chain are also useful. The oligomers can be branched, as in the formula

where $R_3$ is a core branching moiety, including glycerol or pentaerythritol, $R_1$ is alkyl n can range from 2 to hundreds, and m is at least 3.

A suitable oligomer can be formed from about 2 to 2000 monomers. However, the size of the oligomers used can vary so long as the above requirements are met. Normally an oligomer has from about 5 to 500 monomers. Advantageously, an oligomer has from about 10 to 50 monomers. An oligomer can be prepared by polymerizing or co-polymerizing monomers, and the size or molecular weight of the oligomer can be controlled by limiting the extent of this polymerization reaction.

As noted above, the oligomers contained in the polymer of this invention can be the same or different types of oligomers, or oligomers of the same type but different sizes. Therefore, the polymer of this invention can be either a homopolymer or heteropolymer.

The polymer of this invention typically has one single linear polymer backbone with two termini. However, branched polymers and star polymers are also contemplated that have two or more linear polymers, at least one of which is the linear polymer backbone of this invention, covalently linked to a central branching core.

The polymer of this invention can have an inert terminal moiety, typically H, alkyl, and aryl. The alkyl and aryl groups can be substituted or unsubstituted, and normally are methyl, ethyl, phenyl, etc. The polymer can also have one or more reactive moieties capable of reacting with a moiety in another molecule, such as an amino group or a thiol group on a protein. Examples of such reactive moieties include, but are not limited to, acryloyl, alkenyl, tresyl, N-succinimidyloxycarbonyl, 1-benzotriazolyloxycarbonyl, p-nitrophenyloxycarbonyl, N-maleimidyl, aldehydes, acetals, 1-imidazolylcarbonyl, vinylsulfone, iodoacetamide, o-pyridyldithiyl, and the like.

In one embodiment of this invention, the hydrolytically degradable polymer is a poly(ether carbonate) composed of two or more alkylene oxide oligomers and/or alkylene oxide monomers covalently linked together by carbonate linkages. For example, the poly(ether carbonate) can have the formula of

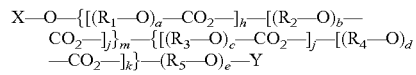

wherein
$R_1$, $R_2$, $R_3$, $R_4$, and $R_5$ are alkyl groups which may be linear, branched, substituted or unsubstituted, and they can be same or different; typically $R_1$, $R_2$, $R_3$, $R_4$, and $R_5$ are ethyl;
a, b, c, d, e each is an integer of from 1 to about 2000, normally from about 5 to 500, and advantageously from about 10 to 50;
h, i, j, and k each is an integer of from 0 to about 100, and the sum of h, i, j, and k is from about 2 to 200, normally from about 5 to 100, and advantageously from about 10 to 50; and
each of X and Y is hydrogen, alkyl, alkenyl, aryl, or reactive moieties as described above, and X and Y can be same or different.

In a preferred embodiment, the poly(ether carbonate) of this invention has the formula of:

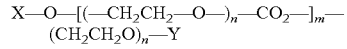

wherein n is an integer of from about 2 to 2000, normally from about 5 to 500, and advantageously from about 10 to 50; m is an integer of from about 2 to 100, typically from about 5 to 100, and advantageously from about 10 to 50, and wherein X and Y can be same or different and each independently is H, alkyl, alkenyl, aryl, or a reactive moiety, acryloyl, tresyl, N-succinimidyloxycarbonyl, 1-benzotriazolyloxycarbonyl, p-nitrophenyloxycarbonyl, N-maleimidyl, aldehydes, acetals, 1-imidazolylcarbonyl, vinylsulfone, iodoacetamide, and o-pyridyldithiyl.

This specific form of poly(ether carbonate) contains repeating ethylene oxide oligomers linked by carbonate linkages that can be hydrolytically cleaved. Such hydrolytic cleavage leads to ethylene oxide oligomers and carbon dioxide. Therefore, the poly(ether carbonate) differs substantially from poly(ethylene glycol) or PEG in having multiple degradable backbone carbonate linkages that allow the polymer to be broken down into many smaller oligomers. Since the rate of degradation of the polymer is proportional to the number of degradable carbonate linkages present and since the size and number of the oligomers can be predetermined, substantial control over both degradation rate and the size of the degradation products is thus possible.

To prepare polymers of the invention, in one example, one or more oligomers as described above are provided each having a hydroxyl group at one terminus and a functional group of —O—CO$_2$—Z at another terminus. The oligomers are then polymerized or co-polymerized in a condensation polymerization reaction under conditions sufficient to form a hydrolytically degradable polymer.

The functional group —O—CO$_2$—Z is capable of reacting with a hydroxyl group to form a carbonate linkage. Typically, Z can be any reactive leaving groups so long as the functional group can react with a hydroxyl group to form a carbonate linkage. Examples of suitable leaving groups include N-succinimidyl, 1-benzotriazolyl, and p-nitrophenyl. Methods for preparing an oligomer having a functional group —O—CO$_2$—Z as described above are well known in the art, and are disclosed in U.S. Pat. Nos. 5,650,234, 5,281,698 and 5,468,478; Veronese, et al., *Appl. Biochem. Biotech.*, 11:141 (1985); and Sartore et al., *Appl. Biochem. Biotech.*, 27:45 (1991), all of which are incorporated herein by reference.

As discussed above, one or more types of oligomers can be polymerized together. In addition, if desired, monomers having a hydroxyl terminus and a functional group —O—CO$_2$—Z at another terminus, can also be included in the polymerization mixture.

Thus, to give an example, the poly(ether carbonate)

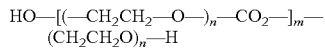

as described above can be prepared in accordance with this method by the following steps. First, an ethylene oxide oligomer is provided having a formula of HO—(—CH$_2$CH$_2$—O—)$_n$—O—CO$_2$—Z, where Z is a reactive leaving group such as N-succinimidyl, 1-benzotriazolyl, and p-nitrophenyl. This oligomer is then polymerized under controlled conditions to provide the above poly(ether carbonate).

In another example of this invention, a first oligomer is provided, which is a bifunctional oligomer having a first functional group of —O—CO$_2$—W at one terminus and, at another terminus, a second functional group of —O—CO$_2$—Z. Both functional groups are capable of reacting with a hydroxyl group to form a carbonate linkage. Z and W are reactive leaving groups, and can be any leaving groups known in the art so long as the functional groups containing them, as stated above, are capable of reacting with a hydroxyl group to form a carbonate linkage. Z and W can be same or different. The preferred Z and W are N-succinimidyl, 1-benzotriazolyl, and p-nitrophenyl. Two or more different bifunctional oligomers can be used in the same polymerization reaction.

Methods for preparing such bifunctional oligomers are similar to those for making the monofunctional oligomers described above. Preferably, Z and W are the same, and the bifunctional molecule Z-oligomer-Z can be provided by activating an oligomer having two hydroxyl terminal groups, with an activating molecule having the formula of Z—O—CO$_2$—Z. Suitable examples of the activating molecule include, disuccinimidylcarbonate, bis(1-benzotriazolyl) carbonate and bis(p-nitrophenyl) carbonate. See, e.g., U.S. Pat. Nos. 5,281,698; 5,650,234; Veronese, et al., *Appl. Biochem. Biotech.*, 11:141 (1985); and Sartore et al., *Appl. Biochem. Biotech.*, 27:45 (1991), all of which are incorporated herein by reference.

In addition to the first oligomer that is bifunctional, a second oligomer is also provided having two terminal hydroxyl groups. This second oligomer is then polymerized with the first oligomer to form the polymer of this invention.

Two or more types of bifunctional oligomers can be used in the same polymerization reaction. In addition, two or more types of oligomers having two terminal hydroxyl groups can also be used in a polymerization reaction. As will be apparent to a skilled artisan, when only one type of bifunctional oligomer and one type of dihydroxyl oligomer are used, and when the two oligomers are the same except for the terminal groups, the polymer formed therefrom will be a homopolymer having a single type of repeating unit or oligomer linked with hydrolytically degradable linkages. Otherwise, a heteropolymer or block polymer or terpolymer will be made containing different types of oligomers in the polymer backbone.

To give an example of the method of this embodiment, the poly(ether carbonate)

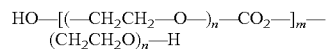

can be prepared by co-polymerizing a first ethylene oxide oligomer having a formula of

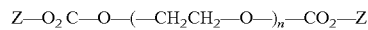

and a second ethylene oxide oligomer HO—(—CH$_2$CH$_2$—O—)$_n$—OH, under suitable polymerization conditions. Z is preferably N-succinimidyl, 1-benzotriazolyl, or p-nitrophenyl. The oligomer

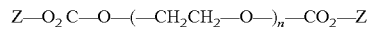

can be prepared by reacting Z—O—CO$_2$—Z with HO—(—CH$_2$CH$_2$—O—)$_n$—OH, under the conditions disclosed in U.S. Pat. No. 5,281,698.

In yet another method, one or more oligomers having two hydroxyl terminal groups are polymerized directly with an activating molecule having the formula of Z—O—CO$_2$—Z to form the hydrolytically degradable polymer. Thus, for example, the poly(ether carbonate)

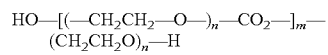

can also be prepared by co-polymerizing an activating molecule Z—O—CO$_2$—Z and the oligomer HO—(—CH$_2$CH$_2$—O—)$_n$—OH, under conditions sufficient to form the poly(ether carbonate).

Again, in this method, either one oligomer is used to generate a homopolymer, or two or more different oligomers can be used in the same polymerization reaction to produce a heteropolymer, or block polymer or terpolymer.

The polymerization reactions are conducted under conditions sufficient to form the hydrolytically degradable polymer of this invention. The polymerization reaction in each of the above-described methods is a condensation reaction. Many different known reaction conditions can be used. Typically, a catalyst is included in the polymerization reaction mixture. Examples of suitable catalysts are organic bases, including triethylamine, pyridine, quinoline, and 4,4-dimethylaminopyridine. Amine bases such as 4,4-dimethylaminopyridine and triethylamine are preferred.

The polymerization can be conducted in either melt or solvent. Suitable solvents include, but are not limited to, acetonitrile, THF, dimethylformamide, dimethylsulfoxide, benzene, toluene, xylenes, chloroform, and methylene chloride. The polymerization reaction rate and the extent of polymerization, which determines the average molecule weight of the final hydrolytically degradable polymer product can be partly controlled by the reaction temperature and the reaction time. Suitable reaction temperature can vary from about 0° C. to 100° C. Higher reaction temperatures lead to greater reaction speed. Preferably, the polymerization reaction is conducted at a temperature of from about 37° C. to 100° C., typically from about 45° C. to 100° C. and advantageously from about 70° C. to 90° C. When the reaction is conducted in a melt, the temperature needs be maintained at a certain minimum temperature in order to keep the reaction mixture at a melt state.

In the above described three embodiments of the method of this invention, the polymerization reactions would be predicted to lead to polymers with an activated carbonate terminal group. In practice, however, NMR analysis of the polymer products indicates that the terminal groups of the hydrolytically degradable polymer prepared therefrom often are hydroxyl groups. While not wishing to be bound by any theory, it is believed that this is caused by reaction with a small amount of water present as an impurity in the reaction. Any small amount of remaining terminally activated carbonate may be removed by hydrolyis in water for a short period or near a neutral pH. The terminal activating groups are much more sensitive to water than are the degradable carbonate linkages.

The polymer of this invention can optionally be activated at one or all termini, thus providing an activated polymer capable of being covalently linked to another molecule, including, for example, a protein, to form a conjugate. The polymer can also be capped at one terminus by an inert group and at another terminus by a reactive moiety.

The polymer of this invention can be activated at its terminus to form a terminal reactive moiety by methods well known to those familiar with the art of organic or polymer chemistry. The well established methods in the broad field of poly(ethylene glycol) chemistry are generally useful, and such methods should be apparent to a skilled artisan. The polymer can be activated at one terminus, or all termini, in which case, the reactive moieties at different termini can be same or different.

For example, the polymer may be activated to form a terminal moiety of N-succinimidyl carbonate (see e.g., U.S. Pat. Nos. 5,281,698, 5,468,478), amine (see, e.g., Buckmann et al. *Makromol. Chem.* 182:1379 (1981), Zaplipsky et al *Eur. Polym. J.* 19:1177 (1983)), hydrazide (See, e.g., Andresz et al. *Makromol. Chem.* 179:301 (1978)), succinimidyl propionate and succinimidyl butanoate (see, e.g., Olson et al. in *Poly (ethylene glycol) Chemistry & Biological Applications*, pp 170-181, Harris & Zaplipsky Eds., ACS, Washington, D.C., 1997; see also U.S. Pat. No. 5,672,662), succinimidyl succinate (See, e.g., Abuchowski et al. *Cancer Biochem. Biophys.* 7:175 (1984) and Joppich et al. *Macrolol. Chem.* 180:1381 (1979), succinimidyl ester (see, e.g., U.S. Pat. No. 4,670, 417), benzotriazole carbonate (see, e.g., U.S. Pat. No. 5,650, 234), glycidyl ether (see, e.g., Pitha et al. *Eur. J. Biochem.* 94:11 (1979), Elling et al., *Biotech. Appl. Biochem.* 13:354 (1991), oxycarbonylimidazole (see, e.g., Beauchamp, et al., *Anal. Biochem.* 131:25 (1983), Tondelli et al. *J. Controlled Release* 1:251 (1985)), p-nitrophenyl carbonate (see, e.g., Veronese, et al., *Appl. Biochem. Biotech.*, 11:141 (1985); and Sartore et al., *Appl. Biochem. Biotech.*, 27:45 (1991)), aldehyde (see, e.g., Harris et al. *J. Polym. Sci. Chem. Ed.* 22:341 (1984), U.S. Pat. Nos. 5,824,784, 5,252,714), maleimide (see, e.g., Goodson et al. *Bio/Technology* 8:343 (1990), Romani et al. in *Chemistry of Peptides and Proteins* 2:29 (1984)), and Kogan, *Synthetic Comm.* 22:2417 (1992)), orthopyridyl-disulfide (see, e.g., Woghiren, et al. *Bioconj. Chem.* 4:314 (1993)), acrylol (see, e.g., Sawhney et al., *Macromolecules*, 26:581 (1993)), vinylsulfone (see, e.g., U.S. Pat. No. 5,900,461). In addition, two molecules of the polymer of this invention can also be linked to the amino acid lysine to form a di-substituted lysine, which can then be further activated with N-hydroxysuccinimide to form an active of N-succinimidyl moiety (see, e.g., U.S. Pat. No. 5,932,462). All of the above references are incorporated herein by reference.

To give an example, the polymer of this invention may be activated to form a terminal reactive moiety of N-succinimidyl carbonate or 1-benzotriazolyl carbonate by reacting the polymer with di-N-succinimidyl carbonate or di-1-benzotriazolyl carbonate respectively. To give another example, terminal reactive moieties such as N-maleimidyl and o-pyridyldithiyl may be prepared by reacting the polymer with activated carbonates connected to N-maleimidyl or o-pyridyldithiyl by linker groups. Terminal aldehyde and acetal moieties can be attached by linking groups. Terminal acid groups can be attached by reaction of the above active carbonates with amino acids or other acid linkers. These acids can then be activated by formation of active esters such as succinimidyl active esters.

The polymer of this invention, activated or not, as prepared by the above methods, can be easily purified from the reaction mixture. Many methods known in the art can be used. A preferred method for purifying the polymer and its derivatives is by precipitation from a solvent in which they are essentially insoluble while the reactants are soluble. Suitable solvents include ethyl ether or isopropanol. As is apparent to a skilled artisan, other methods such as ion exchange, size exclusion, silica gel, and reverse phase chromatography can also be useful.

In accordance with another aspect of this invention, the activated polymer is used to form a conjugate with a biologically active agent. The conjugate comprises the polymer of this invention covalently linked to a biologically active agent. Because the polymer of this invention is hydrolytically degradable in vivo and can be cleaved at the carbonate linkages, thus forming smaller oligomers, the conjugate is especially useful for controlled delivery of the bound agent into animal bodies. Since the polymer in the conjugate is susceptible to breakdown into smaller oligomers, the polymer typically is excreted from animal bodies faster than a polymer of similar size that is not degradable. Thus, potential adverse effects that may be caused by a large polymer's long period of stay in the body is avoided. Therefore, conjugation of the polymer of this invention to a biologically active agent can provide for a sufficient circulation period for the agent while minimizing any adverse effects of the polymer.

In the conjugates of this invention, the linkage between the biologically active agent and the polymer of this invention can be stable or hydrolytically degradable. When it is degradable, substantially all of the polymer can be cleaved off the biologically active agent under physiological conditions, releasing the agent substantially in its native form inside the body. Methods for forming a hydrolytically degradable linkage between a biologically active agent and a water soluble polymer are well known in the art and should be apparent to a skilled artisan. For example, ester linkages formed by the reaction of PEG carboxylic acids or activated PEG carboxylic acids with alcohol groups on a biologically active agent generally hydrolyze under physiological conditions to release the agent. Other hydrolytically degradable linkages include carbonate linkages; imine linkages resulted from reaction of an amine and an aldehyde (see, e.g., Ouchi et al., *Polymer Preprints*, 38(1):582-3 (1997), which is incorporated herein by reference.); phosphate ester linkages formed by reacting an alcohol with a phosphate group; hydrozone linkages which are reaction product of a hydrazide and an aldehyde; acetal linkages that are the reaction product of an aldehyde and an alcohol; orthoester linkages that are the reaction product of a formate and an alcohol; peptide linkages formed by an amine group, e.g., at an end of a polymer such as PEG, and a carboxyl group of a peptide; and oligonucleotide linkages formed by a phosphoramidite group, e.g., at the end of a polymer, and a 5' hydroxyl group an oligonucleotide.

Methods for conjugating the polymer of this invention to a biologically active agent should be apparent based on the above discussion. Typically, the polymer of this invention must be activated to form the activated polymer of this invention as described above, having at least one terminal reactive moiety. The terminal reactive moiety may vary depending on the reactivity of a target moiety on the biologically active agent to be conjugated. Examples of reactive groups on proteins are thiols and amines, while on small molecule drugs, amines, alcohols, thiols, and carboxylic acids are common reactive groups. The conjugate is then formed by reacting the terminal reactive moiety of the activated polymer with the target moiety on the biologically active agent. Such methods are well known in the art, and are discussed in the patents and publications referred to above in the context of forming terminal reactive moieties.

In a preferred embodiment, the polymer of this invention used for forming a conjugate is a poly(ether carbonate) composed of alkylene oxide oligomers, more preferably ethylene oxide oligomers, linked together by carbonate linkages. Ethylene oxide oligomers are poly(ethylene glycol)s with a predetermined molecular weight, typically from about 88 to about 8000, preferably from about 88 to about 2000. Thus, in this embodiment of the invention, the polymer behaves in a similar manner as polyethylene glycol. However, when delivered in vivo, the polymer in the conjugate will break down into a number of smaller oligomer fragments. If the linkage between the polymer and the biologically active agent is stable, then, after degradation, one oligomer is linked to the agent.

In accordance with another aspect of this invention, a hydrolytically degradable hydrogel and method of making thereof are also provided. As is known in the art, a hydrogel typically is a polymeric network formed by crosslinking one or more multifunctional backbone molecules or polymers. The resulting polymeric network is hydrophilic and swells in an aqueous environment thus forming a gel-like material, i.e., hydrogel. Hydrogels are useful for drug delivery as they can be implanted or injected into animal bodies. Typically a hydrogel comprises a backbone bonded to a crosslinking agent.

In accordance with this invention, the polymer of this invention is used as the crosslinking agent in the hydrogel. The polymer must be activated so that it has at least two terminal reactive moieties that are capable of reacting with multiple moieties on the backbone to form covalent linkages.

Alternatively, two or more types of activated polymer are used as crosslinking agents. Each activated polymer has one terminal reactive moiety capable of reacting with a moiety on the backbone, and another terminal reactive moiety capable of reacting with the corresponding terminal reactive moiety on the other type of activated polymer. An example of this other moiety is, for example, a vinyl-containing group such as an acrylate group that can participate in chain polymerization among the different types of activated polymers. When the polymer of this invention is activated so that it has two terminal vinyl groups, the polymer itself may act as both crosslinking agent and backbone, and self-polymerize into a hydrolytically degradable hydrogel through a chain polymerization reaction.

The backbone of the hydrogel is a nontoxic biocompatible macromolecule or small molecule, having at least two or preferably more active groups available to react with the terminal reactive moieties of the crosslinking agent to form covalent linkages. By "biocompatible" it is intended that the molecule used as backbone would not substantially adversely affect the body and tissue of the living subject into which the hydrogel is to be implanted or injected. More particularly, the material does not substantially adversely affect the growth and any other desired characteristics of the tissue cells surrounding the implanted hydrogel. It is also intended that the material used does not cause any substantially medically undesirable effect in any other parts of the living subject. In addition, if the molecule is degradable inside the body, the degradation products should also be substantially biocompatible as defined above. Generally, the methods for testing the biocompatibility of a material well known in the art.

Examples of suitable backbones include, but are not limited to, proteins, modified proteins such as glycoproteins, phosphorylated proteins, acylated proteins, and chemically modified proteins, peptides, aminocarbohydrates, glycosaminoglycans, aminolipids, polyols, polythiols, polycarboxylic acids, polyamines such as dilysine, poly(vinylamine) and polylysine, poly(ethylene glycol) amines, pharmaceutical agents having at least two active groups, etc. Specific examples of the backbone include, but are not limited to, branched PEG amines, fibrin, fibrinogen, thrombin, albumins, globulins, collagens, fibronectin, chitosan, and the like. In addition, the backbone may also be microorganisms such as viral particles, bacterial or yeast cells, animal or human cells or tissues.

The activated polymer of this invention used as a crosslinking agent can be in a linear, branched or star form. In branched or star forms, three or more linear polymers are covalently linked, at one terminus, to a central, branched core moiety. The central branch core moiety can be derived from the amino acid lysine, or polyols such as glycerol, pentaerythritol and sorbitol. Branched PEGs are known in the art. These branched PEGs can be incorporated as components of the poly(ether carbonate)s of this invention.

As will be apparent, because of the carbonate linkages incorporated in the crosslinking agent, the hydrogel of this invention is hydrolytically degradable. In addition, the linkages between the backbones and the crosslinking agents formed from the crosslinking reactions can also be made hydrolyzable, by methods described in the context of the conjugate of this invention. Thus, the hydrogel of this invention can gradually break down or degrade in the body as a result of the hydrolysis of the hydrolytically degradable linkages.

Therefore, the hydrogel of this invention is suitable as a biomedical material and a carrier for the delivery of biologically active agents. For example, the hydrogel can carry therapeutic drugs and can be implanted or injected in the target area of the body. The hydrogel may also carry other agents such as nutrients or labeling agents for imaging analysis. A hydrogel containing a biologically active agent is termed herein as "a delivery system".

In the various applications of the hydrogel of this invention, the biologically active agents to be delivered can be used as the backbone, or part of the backbone of the hydrogel. Alternatively, biologically active agents can be "hinged" to the hydrogel through a polymer of this invention or a linker molecule with one terminus of the polymer or the linker linked to the biologically active agent, and the other being connected through a covalent linkage to the hydrogel. In addition, biologically active agents or other substances to be delivered can also be loaded into the hydrogel during the formation of the hydrogel, or afterwards by, for example, diffusion into the matrix of the hydrogel without being covalently bonded to the hydrogel structure.

Because the crosslinking agents (i.e., the polymers of this invention) in the hydrogel are water soluble, the hydrogel can be substantially water swellable. The degradation or breakdown of the hydrogel in the body is gradual in nature and subject to control because of the hydrolytically degradable carbonate linkages in the crosslinking agents. Thus, the hydrogels of the invention are particularly useful for sustained release of a biologically active agent or other substance in the body. The hydrogels have potential utility for adhesion prevention, bioadhesives, surgical sealants, and related surgical applications.

The present invention is further illustrated in the following examples which are given to illustrate the invention, but should not be considered in limitation of the invention.

EXAMPLE 1

Synthesis of HO-PEC$_{14KDa}$-OH from HO—(—CH$_2$CH$_2$—O—)$_n$CO$_2$Bt (Bt=1-benzotriazolyl) (n$_{ave}$=23)

HO—(—CH$_2$CH$_2$—O—)$_n$CO$_2$Bt (n$_{ave}$=23) (5 g) and 1.2 g of dimethylaminopyridine were dissolved in 10 ml of anhydrous acetonitrile. The reaction was stirred at 70° C. for 22 hours. The product was precipitated with 200 ml of isopropanol, stirred for one-half hour, then collected by vacuum filtration. The product was washed with isopropanol (100 m×2), and dried in vacuo overnight. Yield: 4.1 g (82%). The resulting polymer was 99% pure by gpc analysis and had a molecular weight of 13,800 Da with a polydispersity of 1.47.

EXAMPLE 2

Synthesis of HO-PEC$_{7K}$-OH from Bt-O$_2$C—(—O—CH$_2$CH$_2$—)$_n$—OCO$_2$-Bt and HO—(—CH$_2$CH$_2$—O—)$_n$—H (n$_{ave}$=23)

1. Preparation of Bt-O$_2$C—(O—CH$_2$CH$_2$—)$_n$—OCO$_2$-Bt (n$_{ave}$=23)

HO—(—CH$_2$CH$_2$—O—)$_n$—H (n$_{ave}$=23) (15 g, Aldrich) was dissolved in 100 ml of anhydrous acetonitrile, and solvent was removed by distillation. The residue was dissolved in 100 ml of anhydrous acetonitrile, and 13.3 g (1.5 equivalent) of di(1-benzotriazolyl carbonate) and 3.1 ml (1.3 equiv) of anhydrous pyridine were added. The reaction was stirred at room temperature under Ar overnight. The solvent was evaporated to dryness under reduced pressure. The product was precipitated by addition of 300 ml of cold diethyl ether. The precipitate was stirred under Ar for 30 min., collected by vacuum filtration and dried in vacuo overnight. There was 100% substitution by nmr analysis.

2. Preparation of HO-PEC$_{7K}$-OH

HO—(—CH$_2$CH$_2$—O—)$_n$—H (n$_{ave}$=23) (Aldrich, 10 g) was dissolved in 50 ml of anhydrous acetonitrile and the solvent removed by distillation. The residue was dissolved in 20 ml of anhydrous acetonitrile and 10 g (1.0 equiv) of Bt-O$_2$C—(—O—CH$_2$CH$_2$—)$_n$OCO$_2$-Bt (n$_{ave}$=23) and 2.5 g of dimethyaminopyridine were added. The reaction was stirred at 70° C. for about 22 hours. The product was precipitated with 500 ml of isopropanol, stirred for half hour, then collected by vacuum filtration. The collected product was washed with isopropanol 200 ml×2), and dried in vacuo overnight. The resulting polymer was about 97% pure by gpc and nmr and had a molecular weight of 7000 Da.

EXAMPLE 3

Synthesis of Bis-benzotriazolyl carbonate of HO-PEC$_{7KDa}$-OH 15.0 g of HO-PEC$_{7KDa}$-OH (prepared in Example 2) was dissolved in 50 ml of anhydrous acetonitrile, and solvent was distilled off. This process was repeated once. The residue was dissolved in 50 ml of anhydrous acetonitrile, and 1.8 g of bis(1-benzotriazolyl carbonate) and 0.5 ml of anhydrous pyridine were added. The reaction was stirred at room temperature under Ar overnight. The solvent was evaporated to dryness at reduced pressure and the product was precipitated by addition of 500 ml of isopropanol. The precipitate was stirred under Ar for 30 min., collected by vacuum filtration, and dried in vacuo overnight. Substitution was greater than 95% by nmr. Yield: 14.3 g.

EXAMPLE 4

Preparation of HO—[—(CH$_2$CH$_2$O—)$_n$CO$_2$]$_m$(—CH$_2$CH$_2$O)$_n$—H (n$_{ave}$=45; m$_{ave}$=18 from HO(—CH$_2$CH$_2$O—)$_n$CO$_2$NS (n$_{ave}$=45) (NS=N-succinimidyl) in Solution HO(—CH$_2$CH$_2$O—)$_n$CO$_2$NS (n$_{ave}$=45) (5 g) was dissolved in acetonitrile (10 ml), dimethylaminopyridine (0.6 g) was added, and the resulting mixture was stirred at 70-80° C. overnight. Methylene chloride (20 ml) was added and the resulting mixture added to 600 ml of isopropyl alcohol. The resulting precipitate was collected by vacuum filtration and dried under vacuum overnight at room temperature. Nmr and gpc analysis indicated the polymer to have a molecular weight of 38,000 Da.

EXAMPLE 5

Preparation of HO-PEC$_{35Kda}$-OH from HO(—CH$_2$CH$_2$O—)$_n$CO$_2$NS (n$_{ave}$=45) (NS=N-succinimidyl) in a Melt HO(—CH$_2$CH$_2$O—)$_n$CO$_2$NS (n$_{ave}$=45) (5 g) and dimethylaminopyridine (0.6 g) were mixed and the resulting mixture was stirred at 80-90° C. overnight. Methylene chloride (20 ml) was added and the resulting mixture added to 600 ml of isopropyl alcohol. The resulting precipitate was collected by vacuum filtration and dried under vacuum overnight at room temperature. Nmr and gpc analysis indicated the polymer to have a molecular weight of 35,000 Da.

EXAMPLE 6

Preparation of HO-PEC$_{9.4KDa}$-OH from HO—(—CH$_2$CH$_2$—O—)$_n$—H (n$_{ave}$=14) and di-(N-succinimidyl) Carbonate HO—(—CH$_2$CH$_2$—O—)$_n$—H (n$_{ave}$=14) (10.0 g) was dissolved in 100 ml of acetonitrile and the solution was dried by azeotropic distillation. After removal of acetonitrile, 80 ml of methylene chloride and 20 ml of acetonitrile, 2.7 ml of pyridine, and 4.3 g of di-(N-succinimidyl) carbonate were added. After stirring overnight, the solvent was removed under reduced pressure and 10 ml of acetonitrile and 4 g of DMAP were added. The mixture was stirred at 80-90° C. for 5 h and the product precipitated by addition of isopropanol. The product was collected by vacuum filtration and dried under vacuum at room temperature to obtain the product as a white powder (4.5 g). NMR and GPC analysis indicated that the polymer has a molecular weight of 9400 Da.

EXAMPLE 7

Preparation of Hydrogels from Bt-O$_2$C—O-PEC$_{7KDa}$-O—CO$_2$-Bt and 8-arm-PEG Amine (10 kDa)

In a test tube, 110 mg of Bt-O$_2$C—O-PEC7$_{KDa}$-O—CO$_2$-Bt was dissolved in 1 ml of phosphate buffer (0.1 M, pH 7.0). To it was added 0.36 ml of 8-arm-PEG-amine (110 mg/ml in the buffer). After rapid shaking, it was allowed to sit. A hydrogel formed within 2 hours.

EXAMPLE 8

Degradation of the Hydrogel (Example 7) Prepared from PEC and 8-arm-PEG Amine (10 kDa)

The hydrogel (0.5 g.) was placed in 3 ml of PBS buffer or rat serum at 37° C. Rat serum was replaced with fresh serum every 10 to 12 hours. Gel disappearance was monitored visually. The gel prepared from PEC$_{7KDa}$ disappeared in PBS buffer within 3.5 days but in 1.5 days in rat serum, while the similar gel prepared from PEC3Kda disappeared in PBS buffer in approximately 10 days.

EXAMPLE 9

Preparation of PEC$_{7KDa}$ Diacrylate

HO-PEC$_{7KDa}$-OH (10 g) (prepared in Example 2) in toluene (200 ml) was dried by azeotropic distillation and triethylamine (1.75 ml) in CH$_2$Cl$_2$ was added. The resulting solution was cooled to 0° C. and acryloyl chloride (2.5 ml) was added under argon. After the addition was complete, the mixture was stirred overnight at room temperature. The resulting solution was concentrated, filtered, and the product precipitated from the filtrate by addition of ethyl ether (300 ml). The precipitate was collected by filtration, dissolved in 100 ml of methylene chloride, and the resulting solution stirred with 10 g of sodium carbonate overnight. The mixture was filtered and the product was precipitated with 500 ml of ethyl ether. The product was collected by filtration and dried under vacuum. NMR comparison of acrylate and backbone absorptions indicated approximately 100% of the terminal groups were acryloylated.

EXAMPLE 10

Preparation of Hydrogel from PEC$_{7KDa}$ Diacrylate

PEC$_{7KDa}$ diacrylate (100 mg) was dissolved in 1 ml of pH 7 buffer and 30 ul of potassium persulfate was added. To the resulting solution was added 30 .mu.l of 100 mM iron(II) sulfate solution. The solution was shaken and a hydrogel formed in several minutes.

EXAMPLE 11

Preparation of Degradable Hydrogel from NS—O$_2$C—O-PEC$_{7KDa}$-O—CO$_2$—NS and Chitosan NS—O$_2$C—O-PEC$_{7KDa}$-O—CO$_2$—NS (300 mg) was mixed with 3 ml of a 1 wt. % solution of chitosan at pH 4. The resulting solution formed a clear, firm hydrogel within 2 hours.

EXAMPLE 12

Preparation of HO—[—(CH$_2$CH$_2$O—)$_n$CO$_2$]$_m$(—CH$_2$CH$_2$O)$_n$—H(N$_{ave}$=22; m=2 from benzyl-O—(CH$_2$CH$_2$O)$_n$—H (n$_{ave}$=22) and Bt-O$_2$C—O—(CH$_2$CH$_2$O)$_n$—CO$_2$—Bt (n$_{ave}$=22)

Azeotropically dried benzyl-PEG$_{1KDa}$-OH (40.6 g, 40.6 mmoles), Bt-O$_2$C—O-PEG$_{1KDa}$-O—CO$_2$-BT (25 g, 20.3 mmoles) and dimethylaminopyridine (5 g, 81.2 mmoles) was mixed in 300 ml of acetonitrile. The reaction was stirred at 75-80° C. overnight. The solvent was removed by rotary evaporation and the product was precipitated using diethyl ether/isopropyl alcohol (500 ml, 50/50) in an ice bath. The product was collected by filtration and dried under vacuum. The dry product was placed in a 500 ml Parr bottle and dissolved in 100 ml of anhydrous 1,4-dioxane. 11.0 g of Pd/C (10% pd by wt.) was added and the bottle pressurized with 45 psi of hydrogen and shaken for 20.5 hours. The mixture was filtered to remove the Pd/C and the solvent removed by rotary evaporation. The crude solid was precipitated by adding 500 ml of isopropyl alcohol. The product was collected by filtration and dried under vacuum. The product was demonstrated to be greater than 98% pure with a polydispersity of 1.034 by GPC.

Preparation of NS—O$_2$C—O-PEC$_{3KDa}$-O—CO$_2$—NS (NS=N-succinimidyl) from HO-PEC$_{3KDa}$-OH The dried HO-PEC$_{3KDa}$-OH was dissolved in anhydrous CH$_3$CN (150 ml) and stirred at room temperature under argon. Di-N-succinimidyl carbonate (2.6 g 10 mmoles) was added and allowed to dissolve before pyridine (0.81 ml, 10 mmoles) was added. The reaction mixture was stirred overnight (15 hrs.) The CH$_3$CN was removed under vacuum. The crude solid was dissolved in CH$_2$Cl$_2$ (100 ml) and washed once with buffer solution (100 ml). The aqueous layer was extracted with an additional 50 ml of CH$_2$Cl$_2$ and the com bined organic layers were dried using $Na_2SO_4$. The solvent was removed under vacuum until a viscous residue remained. To this was added IPA (500 ml) to precipitate the product. The product was collected by filtration and dried under vacuum. The product was demonstrated by $^1H$ nmr to have greater than 95% purity.

EXAMPLE 13

Hydrolysis Kinetics of a Single Carbonate Linkage in a PEC Polymer $CH_3O$—$(CH_2CH_2O)_n$—$CO_2(CH_2CH_2O)_n$—$OCH_3$ ($n_{ave}$=13) (1 wt. % in buffer, pH 7.4) was thermostated at 37° C. and the hydrolysis rate of the carbonate linkage was measured by analysis of the product using GPC. The half-life for hydrolysis under these conditions was found to be 44 days.

The foregoing description is to be considered illustrative rather than descriptive of the invention. Therefore, it should be understood that the specific embodiments described herein are illustrative of how the invention may be practiced and that modifications and other embodiments are intended to be included within the scope of the appended claims.

What is claimed is:

1. A method for delivering a biologically active agent into the body of a mammal, comprising administering via injection into a body a carbamate-containing conjugate having the following structure:

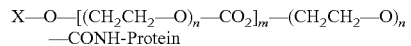
—CONH-Protein wherein:
- X is selected from the group consisting of alkyl, alkenyl and aryl,
- (n) can range from 2 to 2000;
- (m) can range from 2 to 200; and
- Protein is both a biologically active agent and a protein having an amino group for formation of the carbamate linkage.

2. The method of claim 1, wherein X is alkyl.
3. The method of claim 2, wherein alkyl is methyl.
4. The method of claim 1, wherein (n) is 5 to 500.
5. The method of claim 1, wherein (n) is 10 to 50.
6. The method of claim 1, wherein (m) is 2.

* * * * *